United States Patent [19]
Yung et al.

[11] Patent Number: 5,560,877
[45] Date of Patent: Oct. 1, 1996

[54] PROCESS FOR MANUFACTURING AN ETHYLENE VINYL ACETATE SOLE USING FIRST AND SECOND MOLD UNITS

[75] Inventors: Wun-Bin Yung, Tao-Yuan; Jen-Hon Wu, Nan-Tou; Chung-Pin Chang, Taichung; Yao-Pi Chung, Taichung Hsien, all of Taiwan

[73] Assignee: Taiwan Footwear Research Institute, Taichung, Taiwan

[21] Appl. No.: 505,635

[22] Filed: Jul. 21, 1995

[51] Int. Cl.⁶ .................................................. B29C 44/02
[52] U.S. Cl. ............................ 264/51; 264/161; 264/293; 264/321
[58] Field of Search ................................ 264/51, 53, 54, 264/161, 293, 321

[56] References Cited

U.S. PATENT DOCUMENTS

| | | | |
|---|---|---|---|
| 2,772,196 | 11/1956 | Pooley | 156/79 |
| 4,021,380 | 5/1977 | Nuttall | 264/55 |
| 4,446,254 | 5/1984 | Nakae et al. | 521/92 |
| 4,594,283 | 6/1986 | Ohigashi | 156/296 |
| 4,648,923 | 3/1987 | Chapnick | 156/245 |
| 4,674,204 | 6/1987 | Sullivan et al. | 264/244 |
| 5,141,578 | 8/1992 | Yang | 264/45.1 |
| 5,147,589 | 9/1992 | Chang et al. | 264/45.1 |
| 5,308,420 | 5/1994 | Yang | 264/46.6 |
| 5,318,645 | 6/1994 | Yang | 264/45.1 |
| 5,350,544 | 9/1994 | Bambara et al. | 264/293 |

*Primary Examiner*—Allan R. Kuhns
*Attorney, Agent, or Firm*—Cushman Darby & Cushman, L.L.P.

[57] ABSTRACT

A process for manufacturing an ethylene vinyl acetate (EVA) sole that involves weighing molding compounds for manufacturing the sole. The molding compounds include, by weight, 65–75% of ethylene vinyl acetate pellets, 3–5% of blowing agents, 20–30% of fillers, and 1–2% of crosslinking agents. The molded compounds are mixed, and extruded by means of a twin screw extruder so as to form a web of unfoamed extruded output. The web is cut into sheets. At least one of the sheets is placed into a first mold unit, which is heated and pressurized so as to form a rough foamed sole. The rough foamed sole is placed into a second mold unit, which is heated, pressurized, and cooled so as to form an embossed sole with a predetermined pattern. The embossed sole is trimmed so as to form a finished ethylene vinyl acetate sole.

3 Claims, 1 Drawing Sheet

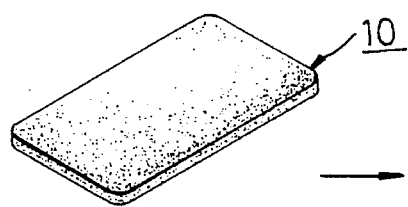
FIG.1
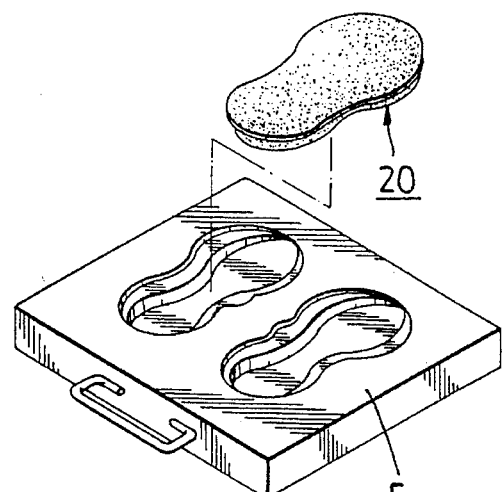
FIG.2
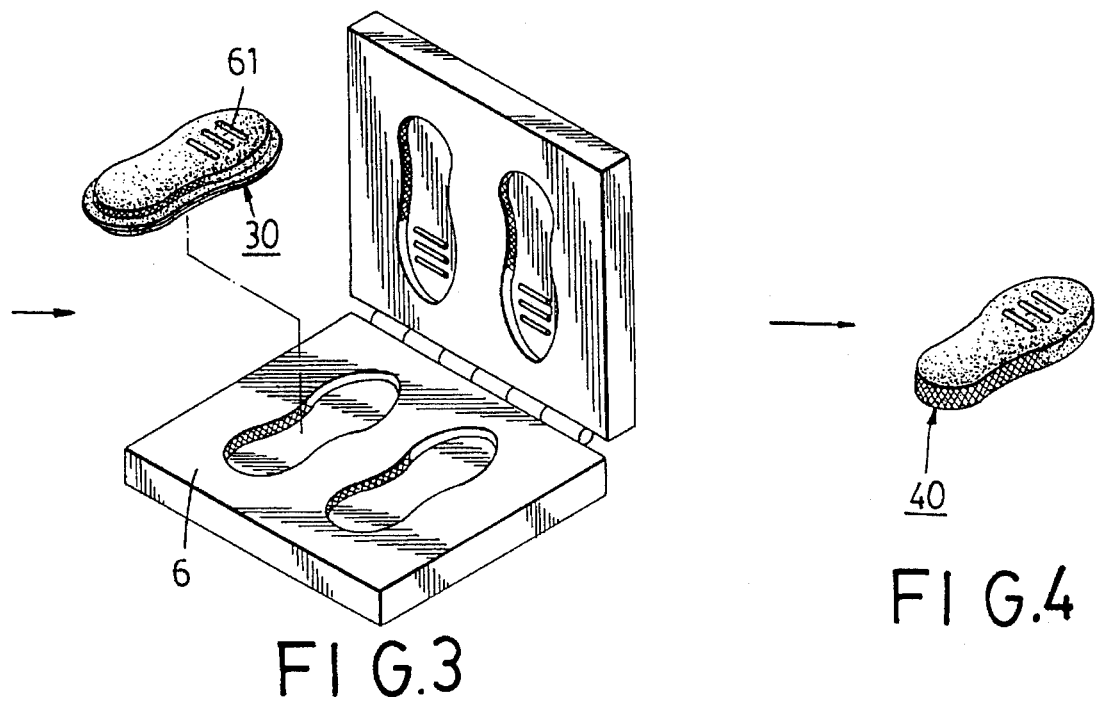
FIG.3
FIG.4

PROCESS FOR MANUFACTURING AN ETHYLENE VINYL ACETATE SOLE USING FIRST AND SECOND MOLD UNITS

BACKGROUND OF THE INVENTION

1. Field of the Invention

This invention relates a process for manufacturing a sole, more particularly to a process for manufacturing an ethylene vinyl acetate sole.

2. Description of the Related Art

Conventionally, EVA (ethylene vinyl acetate) soles are formed by the following steps:

(1) weighing manually the molding compounds for manufacturing the EVA sole;

(2) mixing the molding compounds in a dispersion kneader;

(3) blending and calendering the molding compounds in a roll-mixer;

(4) extruding the molding compounds by means of a single screw extruder so as to form spaghettilike extruded outputs, the weight of each of the extruded outputs being controlled by a gear pump;

(5) placing the extruded outputs in a heated, pressurized first mold so as to form a rough foamed sole;

(6) trimming the rough foamed sole;

(7) placing the rough foamed sole in a heated, pressurized second mold so as to form a finished EVA sole.

The conventional process for manufacturing the EVA sole suffers from the following disadvantages:

(1) The process is quite complicated and is time-consuming and labor-intensive.

(2) Bulky mixing, blending and calendering apparatuses are used in the conventional process, occupying a lot of working space.

(3) The rotating speed of the screw of the single screw extruder must be controlled (i.e., cannot be too fast) in order to prevent excessive heat, which results from the friction between the molding compounds and the screw shaft of the single screw extruder and causes the EVA to foam prematurely. The too early foamed EVA causes the extruded outputs to be unsuitable for further processing. In addition, the single screw extruder will be damaged by the excess heat. Therefore, the production rate of the EVA sole cannot be high.

(4) The defect ratio of the spaghettilike extruded outputs is high.

SUMMARY OF THE INVENTION

It is therefore an object of this invention to provided a process for manufacturing an EVA sole which can overcome the above-mentioned disadvantages.

According to the present invention, the process for manufacturing an EVA sole comprises the steps of:

(1) weighing the molding compounds for manufacturing the ethylene vinyl acetate sole at a predetermined weight ratio;

(2) mixing the molding compounds, extruding the molding compounds by means of a twin screw extruder so as to form a web of unfoamed extruded output, and cutting the web of unfoamed extruded output into sheets, each of the sheets having a predetermined length;

(3) placing at least one of the sheets into a first mold unit which is heated and pressurized so as to form a rough foamed sole;

(4) placing the rough foamed sole into a second mold unit which is heated, pressurized and cooled so as to form an embossed sole with a predetermined pattern; and (5) trimming the embossed sole so as to form a finished ethylene vinyl acetate sole.

In the preferred embodiment, the molding compounds include, by weight, 65–70% of ethylene vinyl acetate pellets, 3–5% of blowing agents, 20–30% of fillers, and 1–2% of crosslinking agents.

Preferably, in step (3), the first mold unit is heated at a temperature of 150°–160° C., and is pressurized under a pressure of 120–150 kg/cm$^2$ for 12–15 minutes.

Preferably, in step (4), the second mold unit is heated at a temperature of 150°–160° C., and is pressurized under a pressure of 100–120 kg/cm$^2$ for 12–15 minutes.

BRIEF DESCRIPTION OF THE DRAWINGS

Other features and advantages of this invention will become apparent in the following detailed description of the preferred embodiment of this invention with reference to the accompanying drawings, in which:

FIGS. 1 to 4 are schematic views illustrating the process for manufacturing an EVA sole of the present invention.

DETAILED DESCRIPTION OF THE PREFERRED EMBODIMENT

In a preferred embodiment of the present invention, the molding compounds for manufacturing an EVA sole which include ethylene vinyl acetate pellets, blowing agents, fillers and crosslinking agents are weighed so that the molding compounds have a predetermined weight ratio relative to one another. The molding compounds have, by weight, 65–70% of ethylene vinyl acetate pellets, 3–5% of blowing agents, 20–30% of fillers, and 1–2% of crosslinking agents.

The molding compounds are then mixed in a mixing tank and fed into a twin screw extruder to form a web of unfoamed extruded output by means of a T-die. The upper end of the T-die has screws which can be positioned operably in order to adjust the extrusion gap defined under the lower end of the T-die, i.e., to adjust the thickness of the extruded web. The extruded web is cut into flat sheets by means of a cutting machine which is located immediately downstream to the twin screw extruder. Each of the sheets has a predetermined length.

Referring to FIGS. 1 to 4, an unfoamed sheet 10 is placed into a first mold unit 5 which is heated and pressurized so as to form a rough foamed sole 20, as shown in FIG. 2. The first mold 5 is heated at the temperature of 150°–160° C., and is pressurized under the pressure of 120–150 kg/cm$^2$ for 12–15 minutes. It is noted that not only can a single sheet 10 be placed in the first mold unit 5 to form the rough foamed sole 20, but also two or more sheets 10 can be superposed on one another in the first mold unit 5 to form a rough foamed sole 20 of a desired thickness.

The rough foamed sole 20 is placed into a second mold unit 6 which is heated, pressurized and cooled so as to form an embossed sole 30 with a predetermined pattern 61, as shown in FIG. 3. The second mold unit 6 is heated at a temperature of 150°–160° C., and is pressurized under a pressure of 100–120 kg/cm$^2$ for 12–15 minutes.

The redundant parts of the embossed sole 30 are trimmed off so as to form a finished EVA sole 40, as shown in FIG. 4.

The advantages of the process for manufacturing the EVA sole according to the present invention are as follows:

(1) Since there is no need to use the bulky mixing, blending and calendering apparatuses, the labor and instrumental costs are reduced and the available working space is increased.

(2) The process of the present invention is simpler than that of the prior art because the mixing, extruding and cutting steps can be performed in a continuous way.

(3) The twin screw extruder is used to blend and extrude the molding compounds and there are no blending and calendering steps in the process of the present invention. Therefore, the production rate can be increased.

(4) Since the sheets 10 are flat and smooth, unlike the spaghettilike extruded outputs of the prior art, air will not be trapped between the sheets 20 of the finished EVA sole 40. Therefore, the defect ratio of the EVA sole product is low.

(5) Since the EVA sole can be formed with two or more sheets, a sandwiched or two-density EVA sole which includes an outsole and a middle sole can be formed in a single step.

With this invention thus explained, it is apparent that numerous modifications and variations can be made without departing from the scope and spirit of this invention. It is therefore intended that this invention be limited only as indicated in the appended claims.

We claim:

1. A process for manufacturing an ethylene vinyl acetate sole, comprising the steps of:

weighing molding compounds for manufacturing said ethylene vinyl acetate sole;

mixing said molding compounds;

extruding said molding compounds by means of a twin screw extruder so as to form a web of unfoamed extruded output;

cutting said web of unfoamed extruded output into sheets, each of said sheets having a predetermined size;

placing at least one of said sheets into a first mold unit which is heated and pressurized so as to form a rough foamed sole;

placing said rough foamed sole into a second mold unit which is heated, pressurized, and cooled so as to form an embossed sole with a predetermined pattern; and trimming said embossed sole, wherein said molding compounds include, by weight, 65–70% of ethylene vinyl acetate pellets, 3–5% of blowing agents, 20–30% of fillers, and 1–2% of crosslinking agents.

2. A process as claimed in claim 1, wherein in said step of placing at least one of said sheets into a first mold unit, said first mold unit is heated at a temperature of 150°–160° C., and is pressurized under a pressure of 120–150 kg/cm$^2$ for 12–15 minutes.

3. A process as claimed in claim 1, wherein in said step of placing said rough foamed sole into a second mold unit, said second mold unit is heated at a temperature of 150°–160° C., and is pressurized under a pressure of 100–120 kg/cm$^2$ for 12–15 minutes.

* * * * *